INVENTOR.
DAVID A. WALTON
STANLEY P. DESJARDINS
BY Edwin D. Grant

ATTORNEY

INVENTOR.
DAVID A. WALTON
STANLEY P. DESJARDINS
BY Edwin D. Grant

ATTORNEY

United States Patent Office 3,436,021
Patented Apr. 1, 1969

3,436,021
ROCKET NOZZLE SUPPORT AND
ACTUATION APPARATUS
David A. Walton, Kent, Wash., and Stanley P. Desjardins,
Brigham City, Utah, assignors to Thiokol Chemical
Corporation, Bristol, Pa., a corporation of Delaware
Filed Nov. 29, 1966, Ser. No. 597,767
Int. Cl. B64c 15/04
U.S. Cl. 239—265.35                                    1 Claim This invention relates to rocket motors and, more particularly, to apparatus for rotatably mounting a thrust nozzle on a rocket motor.

The invention disclosed herein provides an effective support and actuation system for a rocket motor thrust nozzle of the submerged type, i.e., a nozzle the forward end of which extends into the combustion chamber of the rocket motor on which it is mounted. Briefly described, thrust nozzle mounting and actuation arrangements constructed in accordance with the principles of the present invention comprise a pair of brackets which project from the aft end closure of a rocket motor, a pair of support members each slidably or rollably supported on a curved surface of a respective one of said brackets, a thrust nozzle pivotally mounted between said support members with its forward end extending through an aperture in said aft end closure, a flexible, annular seal connected at its inner edge to the forward periphery of said thrust nozzle and at its outer edge to said aft end closure, and actuation means for rotating said thrust nozzle.

Accordingly, it is an object of this invention to provide an effective means for controlling the thrust vector of a rocket motor.

Another object of this invention is to provide a rotatable thrust nozzle of the submerged type.

Still another object of this invention is to provide an uncomplicated, lightweight and strong apparatus for rotatably mounting a thrust nozzle on a rocket motor.

These and other objects are realized in the preferred embodiment of the invention that is illustrated in the accompanying drawings. It is to be understood, however, that the invention is not limited to the design and construction of the preferred embodiment, since various modifications can be made thereto without departing from the scope of the invention as defined hereinafter.

In the drawings.

Throughout the specification and drawings, the same reference numbers refer to the same parts.

Figure 1:
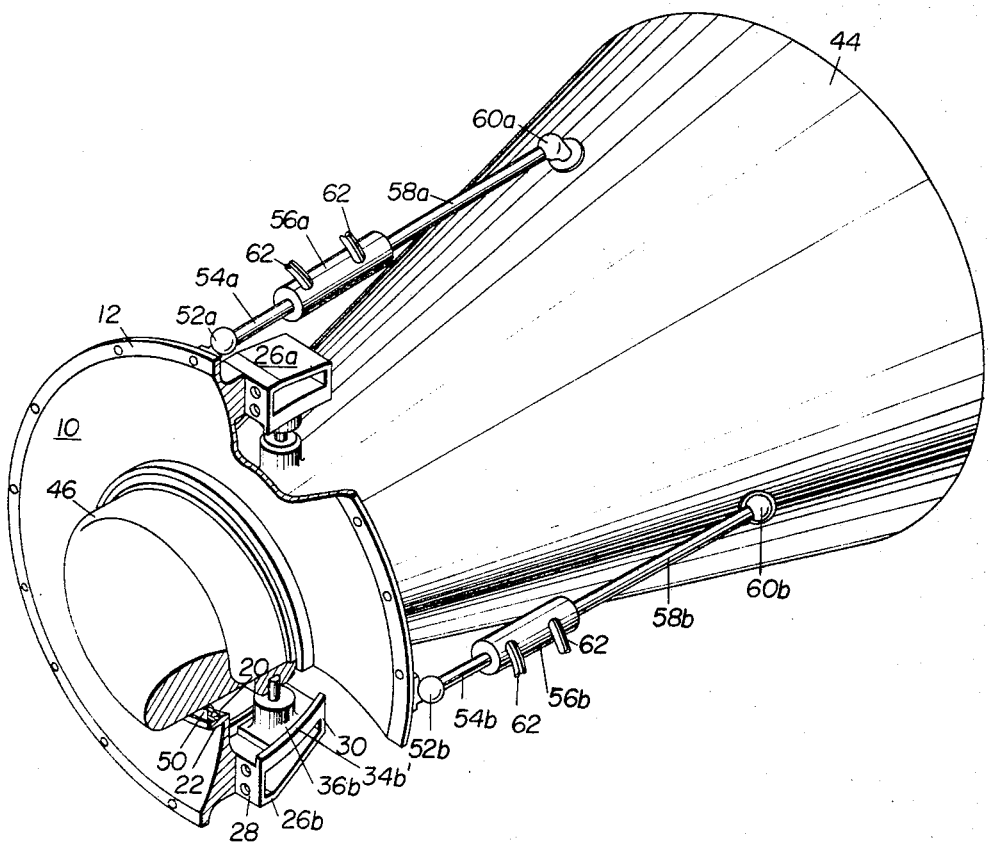
FIGURE 1 is a pictorial view illustrating the preferred embodiment of the invention, portions of certain components thereof being broken away for clarity.
Figure 2:
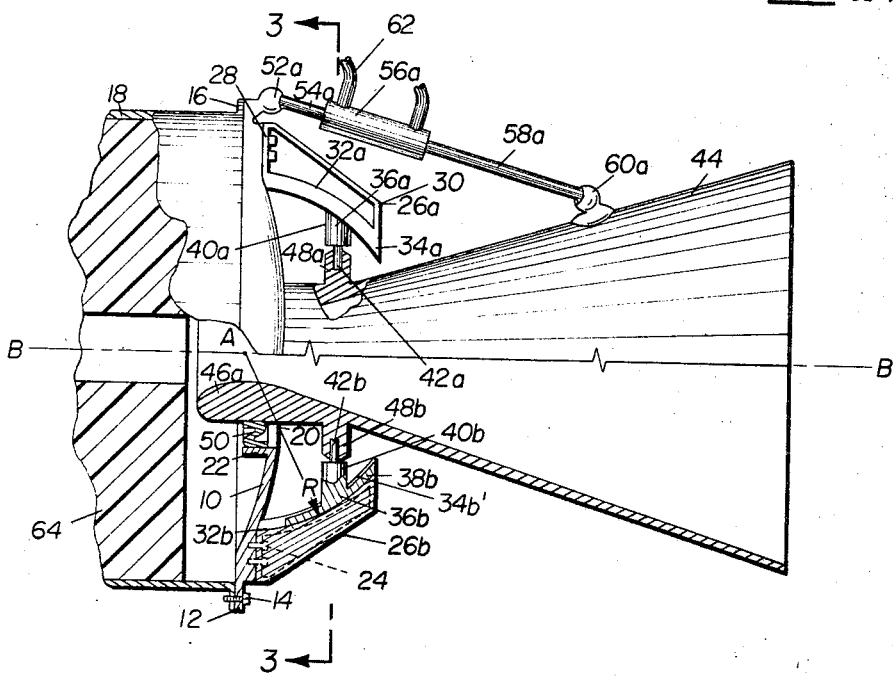
FIGURE 2 is a sectional view of the preferred embodiment, taken along the longitudinal axis of the thrust nozzle thereof.

In FIGURE 1 reference number 10 designates the aft closure member of a rocket motor. More specifically, as illustrated in FIGURE 2, closure member 10 comprises an integral, circumferentially extending bolt flange 12 that is fixedly secured by means of a plurality of bolts 14 to a mating flange 16 on the aft end of the tubular casing 18 of a rocket motor. Closure member 10 has an aperture 20 formed therein, and an integral circumferentially extending flange 22 projects forwardly from the edge of this aperture.

Figure 3:
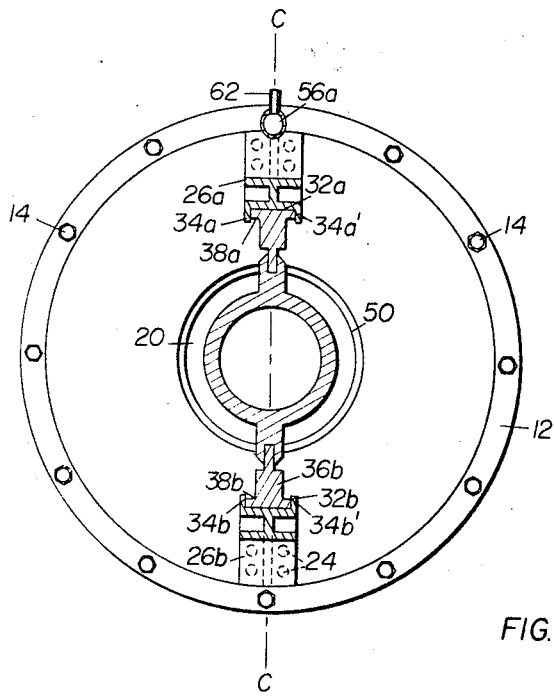
FIGURE 3 is a cross-sectional view of the preferred embodiment, taken along the axis of two pivots incorporated therein.

Fixedly mounted on closure member 10 by means of a plurality of screws 24 (illustrated by broken lines in both FIGURES 2 and 3) are two brackets 26a, 26b each of which comprises an I-shaped section to which is welded a forward wall 28 and an aft wall 30. As can be seen in FIGURE 3, brackets 26a, 26b are diametrically opposed relative to aperture 20 and equidistant therefrom, and as can be seen in FIGURE 2 each bracket has an inwardly facing cylindrical surface 32a, 32b (i.e., all points on the surfaces of said brackets which face each other are a distance R from a line A, represented as a point in FIGURE 2, that intersects the central axis B of aperture 20 and is perpendicular thereto). Extending from each edge of the surfaces 32a, 32b of brackets 26a, 26b is an integral retaining rail 34a, 34a', 34b, 34b'.

A support member 36a, 36b is supported on each surface 32a, 32b of brackets 26a, 26b. More specifically, each support member 36a, 36b is provided with a base 38a, 38b the outer surface of which conformably and slidably abuts a respective one of the surfaces 32a, 32b. Each support member 36a, 36b is also formed with a cylindrical, inwardly projecting portion 40a, 40b that is integral with said base, and with a cylindrical, inwardly projecting end portion 42a, 42b which has a decreased diameter. As illustrated in FIGURE 2, end portions 42a, 42b of support members 36a, 36b have a common axis C, and as illustrated in FIGURE 3 the sides of the base 38a, 38b of each of said support members slidably abut the retaining rails 34a, 34a', 34b, 34b' of the bracket 26a, 26b on which it is supported.

The preferred embodiment of the invention has a thrust nozzle 44 the forward portion 46 of which extends through aperture 20 and has a cylindrical periphery. Integrally formed on thrust nozzle 44 are two outwardly projecting, diametrically opposed bosses 48a, 48b each having formed therein a hole in which the end portion 42a, 42b of a respective one of the support members 36a, 36b is rotatably engaged.

As can best be seen in FIGURE 1, an annular seal member 50 is fixedly connected at its inner edge to the periphery of the forward portion 46 of thrust nozzle 44 and at its outer edge to flange 22 of closure member 10. Because of its convoluted design, seal member 50 is flexible, and thus the forward portion 46 of thrust nozzle 44 can be moved toward or away from any point of flange 22.

Also illustrated in FIGURE 1 are two support lugs 52a, 52b integrally formed on closure member 10 and spaced apart 90° thereon. The end of each support lug 52a, 52b is formed with a socket in which the ball-shaped end of a shaft 54a, 54b is pivotally engaged, the opposite end of said shaft being fixedly connected to a double-acting hydraulic cylinder 56a, 56b of conventional design. The drive shaft 58a, 58b of each cylinder 56a, 56b is also pivotally connected by the same type of ball-and-socket joint to one of two support lugs 60a, 60b fixedly mounted on the exit cone of thrust nozzle 44 and spaced apart 90° thereon. Conduits 62 connect cylinders 56a, 56b to a source of high pressure fluid (not shown) carried on the rocket motor.

It will be recognized by persons skilled in the art of rocket motors that the above-described components of the preferred embodiment of this invention can be formed of a great variety of well-known materials. For example, seal member 50 can be made of a suitable tungsten alloy formed with the proper thickness and number of convolutions to provide the required flexibility of the seal member. Also in some instances a heat-resistant polymer-impregnated fibrous material or an elastomer can be employed for fabrication of seal member 50. Thrust nozzle 44 and the structural components of the embodiment can be formed of suitable metals or plastic materials.

In the preferred embodiment of the invention, casing 18 contains a centrally perforated solid propellant charge 64 which, when ignited, produces thrust gas that is discharged through thrust nozzle 44. It will be recognized from the foregoing description of the components of the illustrated embodiment that each support member 36a, 36b can slide either toward or away from closure member 10. Since the end portions 42a, 42b of the support members are engaged with thrust nozzle 44, movement of one support member in one direction longitudinally along its supporting surface 32a, 32b will be accompanied by movement of the other support member in the opposite direction longitudinally along its supporting surface and by rotation of the longitudinal axis of thrust nozzle 44 in a first plane disposed perpendicular to said surfaces 32a, 32b. Furthermore, thrust nozzle 44 can be rotated but is restrained against lateral movement relative to surfaces 32a, 32b by the retaining rails 34a, 34a', 34b, 34b'. In addition, seal member 50 has sufficient rigidity to urge support members 36a, 36b firmly but slidably against surfaces 32a, 32b respectively. After charge 64 is ignited, forces are applied against thrust nozzle 44 which tend to separate it from casing 18, but the curved shape of brackets 26a, 26b prevent displacement of said thrust nozzle axially of casing 18. If a change in the flight direction of the rocket motor is desired, this can readily be accomplished by actuation of one or both of the cylinders 56a, 56b. For example, upward motion of the rocket motor (the pitch plane being considered as perpendicular to axis C in FIGURE 2) can be effected by actuating cylinder 56a to retract drive shaft 58a therein, whereupon support member 40a will be moved from its illustrated neutral position in FIGURE 2 to a position nearer closure member 10, and conversely support member 36b will be moved farther from said closure member, thus rotating the longitudinal axis of thrust nozzle 44 in said first plane disposed perpendicular to the cylindrical surfaces 32a, 32b. If the rocket motor is to be turned downward, cylinder 56a can of course be actuated to extend the drive shaft 58a thereof from its illustrated position in FIGURE 2. Likewise, the rocket motor can be yawed by actuating cylinder 56b to retract or extend its drive shaft 58b and thereby rotate thrust nozzle 44 about end portions 42a, 42b of support members 36a, 36b (and, more specifically, to thereby rotate the longitudinal axis of thrust nozzle 44 in a second plane disposed perpendicular to said first plane that is disposed perepndicular to the cylindrical surfaces 32a, 32b of brackets 26a, 26b).

It will thus be seen that the objects set forth above are efficiently attained by means of the invention and, since certain changes can obviously be made in the disclosed embodiment without departing from the scope of the invention, it is intended that all matter contained in the above-description or shown in the accompanying drawings shall be interpreted as illustrative and not in a limiting sense.

What is claimed is:

1. In a rocket motor, the combination comprising:
    a closure member having an aperture formed therein;
    a pair of brackets fixedly projecting from said closure member in diametrically opposed relation to said aperture and each having an inwardly facing curved surface;
    a pair of support members each supported on the curved surface of a respective one of said brackets so as to be movable lengthwise thereof while being restrained from lateral movement relative thereto;
    a thrust nozzle the forward end of which extends through said aperture and is pivotally mounted between said support members, whereby the longitudinal axis of said thrust nozzle is rotatable in a first plane disposed substantially perpendicular to the curved surfaces of said support members and in a second plane disposed substantially perpendicular to said first plane;
    a flexible, annular seal member fixedly connected at its inner edge to the forward periphery of said thrust nozzle and at its outer edge to said closure member; and
    actuation means carried by said rocket motor and operatively connected to said thrust nozzle for rotating the longitudinal axis thereof in said first and second planes.

References Cited

UNITED STATES PATENTS

| | | |
|---|---|---|
| 2,931,172 | 4/1960 | Billman. |
| 3,044,258 | 7/1962 | Carlton et al. |
| 3,208,215 | 9/1965 | Brown _____ 239—265.35 |

M. HENSON WOOD, JR., *Primary Examiner.*

H. NATTER, *Assistant Examiner.*

U.S. Cl. X.R.

239—587